United States Patent [19]

Oshita et al.

[11] Patent Number: 4,875,540
[45] Date of Patent: Oct. 24, 1989

[54] ELECTRIC POWER STEERING SYSTEM

[75] Inventors: Saiichiro Oshita; Toyohiko Mouri; Tsutomu Takahaski, all of Ohta, Japan

[73] Assignee: Fuji Jukogyo Kabushiki Kaisha, Tokyo, Japan

[21] Appl. No.: 203,302

[22] Filed: Jun. 6, 1988

[30] Foreign Application Priority Data

Jun. 9, 1987 [JP] Japan ................................ 62-143808

[51] Int. Cl.$^4$ .......................... B62D 5/04; B62D 6/02
[52] U.S. Cl. ..................................... 180/79.1; 180/142
[58] Field of Search ...................... 180/79.1, 142, 141; 74/388 RS

[56] References Cited

U.S. PATENT DOCUMENTS 3,958,656  5/1976  Niemann ............................. 180/79.1
4,664,211  5/1987  Oshita et al. ....................... 180/79.1

Primary Examiner—John A. Pekar
Attorney, Agent, or Firm—Martin A. Farber

[57] ABSTRACT

A system having a motor operatively connected to a steering system for reducing the steering effort. The system is provided with a torsion torque sensor provided for detecting torsion torque generating in the steering system in steering operation. In response to the output signal of the torsion torque sensor, an assist signal is produced. A return torque signal dependent on the lateral acceleration exerted on a motor vehicle is generated. The return torque signal is added to the assist signal, thereby operating the motor to return a steering wheel.

14 Claims, 4 Drawing Sheets

ELECTRIC POWER STEERING SYSTEM

BACKGROUND OF THE INVENTION

The present invention relates to an electric power steering system for a motor vehicle, and more particularly to a system for controlling a motor in accordance with the turning of a steering wheel.

The electric power steering system has a torsion torque sensor for measuring torsion torque in a steering shaft. The system is adapted to produce an assist signal to control the rotational direction and torque of a motor in dependency on a torsion torque signal from the sensor (Japanese Patent Application Publication No. 45-41246). The response of the steering system and the returnability of the steering wheel may deteriorate because of the inertia of the motor, the friction of a reduction gear train provided in the system, and other factors.

There has been proposed a control system which may prevent the above-described disadvantages (U.S. Pat. No. 4,664,211). The system is provided for producing an assist signal dependent on the torsion torque signal from the torsion torque sensor and on the vehicle speed, and a return torque signal depending on an output signal of a steering angle sensor, for returning the steering wheel to a neutral position. The signals are added for controlling the motor.

In this steering system, the return signal is determined only by the steering angle sensor. Accordingly, if the return signal is set to provide a sufficient return torque when the lateral acceleration exerted on the motor vehicle during cornering is in a low range, when the lateral acceleration is high (for example, higher than 0.3 G) during cornering at a low or middle vehicle speed (for example, 20 Km/h to 60 Km/h), the return starting speed of the steering wheel becomes insufficient, resulting in delay of the returning of the steering wheel.

SUMMARY OF THE INVENTION

The object of the present invention is to provide a system which controls the return torque in accordance with the lateral acceleration.

The other objects and features of this invention will become understood from the following description with reference to the accompanying drawings.

DETAILED DESCRIPTION OF THE PREFERRED EMBODIMENT

Figure 1:
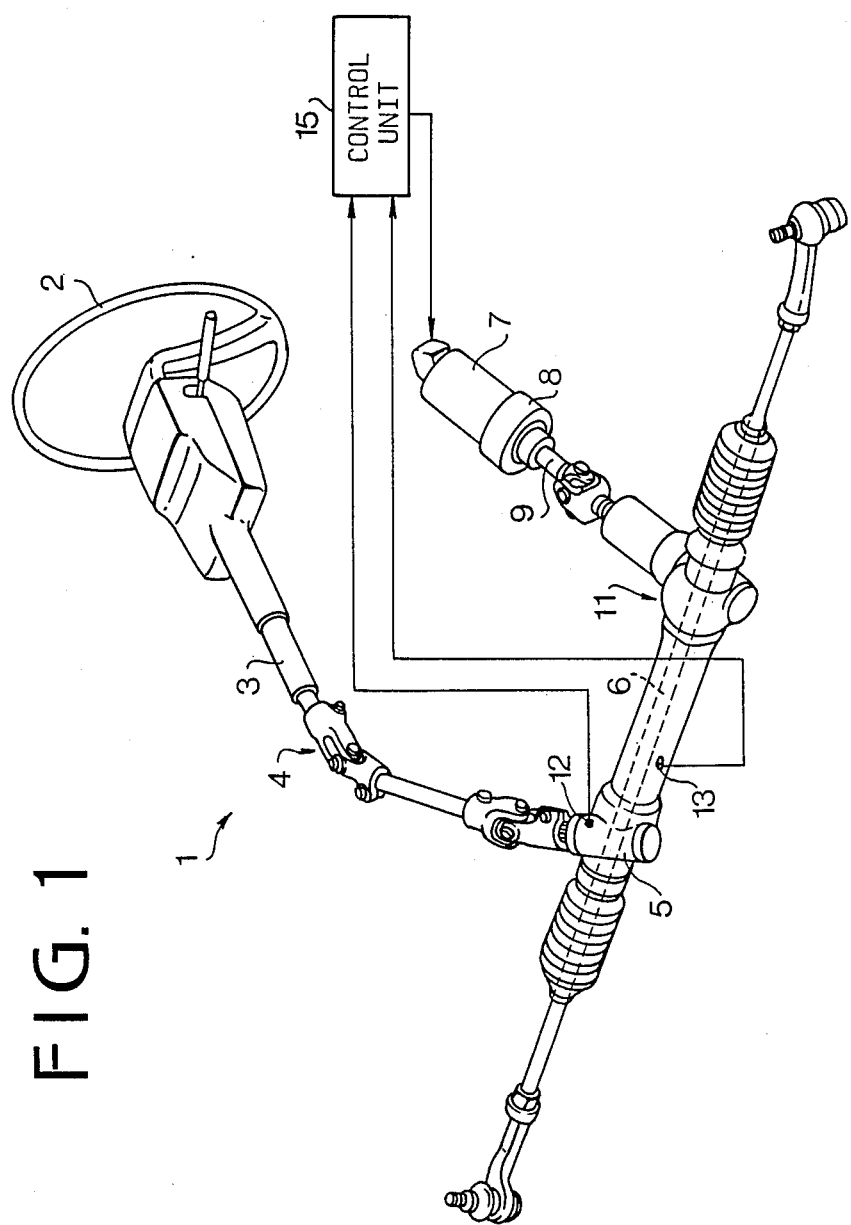
FIG. 1 is a perspective view showing a power steering system to which the present invention is applied.

Referring to FIG. 1, a steering system 1 is a rack-and-pinion type and comprises a steering wheel 2, steering shaft 3, joint 4, gear box 5, and rack 6. Another rack-and-pinion device 11 is provided for an electric power steering. A pinion of the device 11 is engaged with the rack 6. The pinion is operatively connected with an output shaft 9 of a reduction gear device 8 attached to a motor 7. A torsion torque sensor 12 is provided on the gear box 5 for measuring the torsion torque of the steering shaft, and a steering angle sensor 13 is provided adjacent to the rack 6 so as to measure the axial movement of the rack 6 corresponding to the steering angle. Outputs of the sensors 12 and 13 are applied to a control unit 15 of the present invention.

Figure 2A:
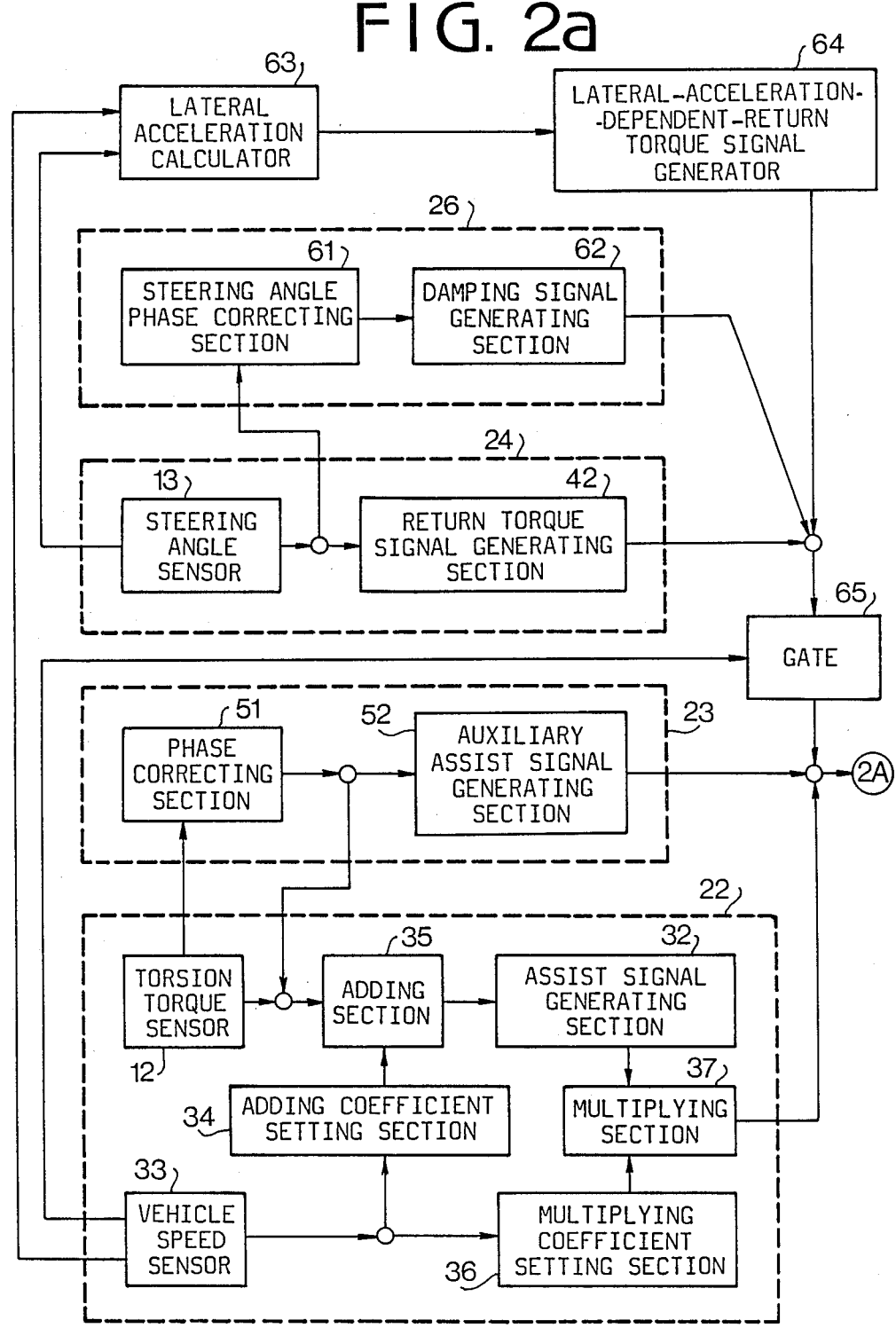
FIGS. 2a and 2b show a block diagram of a system according to the present invention.
Figure 2B:
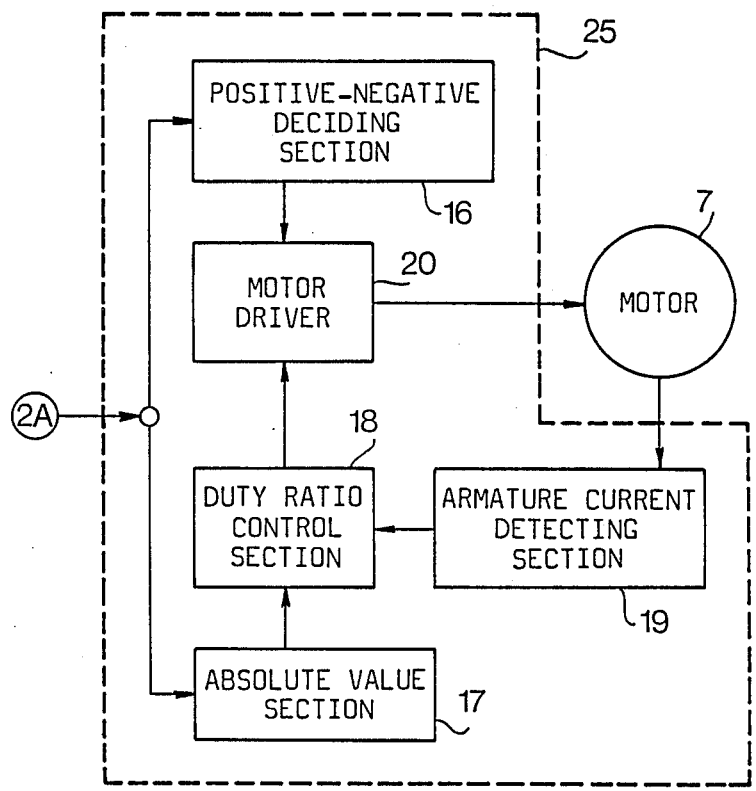

FIGS. 2a and 2b show the control unit 15 which comprises an assist command section 22, auxiliary assist command section 23, return command section 24, damping command section 26, and drive control section 25.

The assist command section 22 comprises the torsion torque sensor 12 and a vehicle speed sensor 33. The torsion torque sensor 12 produces an output signal representing the torsion torque and the direction of the torsion at the steering shaft. The output signal of the vehicle speed sensor 33 is applied to an adding coefficient signal setting section 34 and a multiplying coefficient setting section 36. The adding coefficient signal from the section 34 decreases as the vehicle speed increases. Outputs of the torsion torque sensor 12 and adding coefficient setting section 34 are added at an adding section 35, the output of which is applied to an assist signal generating section 32. The assist signal is generated from the section 32, when the torsion torque rises above a predetermined value and has a polarity dependent on the torsion torque direction of the steering shaft. On the other hand, the multiplying coefficient signal from the section 36 decreases with an increase of the vehicle speed. The assist signal is multiplied by the multiplying coefficient at a multiplying section 37, so that the assist signal is corrected.

The auxiliary assist command section 23 comprises a phase correcting section 51 applied with the output of the torsion torque sensor 12 for producing an output which is proportional to the differential of the output of the sensor 12. Namely, the output of the section 51 represents the rate of the variation of the torsion torque. The output of the phase correcting section 51 is applied to an auxiliary assist signal generating section 52. The output signal of the section 51 is also added to the output of the torsion torque sensor 12 and fed to the adding section 35, thereby correcting the phase of the assist signal to meet the operation of the motor 7.

The return command section 24 includes the steering angle sensor 13, the output signal of which is applied to a return torque signal generating section 42. The section 42 generates a return torque signal dependent on the steering angle.

The damping command section 26 has a steering angle phase correcting section 61 applied with the signal from the steering angle sensor 13 for producing an output which is proportional to the differential of the output of the sensor 13, and a damping signal generating section 62 responsive to the output of the section 61 for producing a damping signal. The damping signal generated when the steering angular velocity exceeds a predetermined small value and increases with an increase of the steering angular velocity. When the steering angular velocity exceeds a predetermined large value, the damping signal becomes constant. The polarity (direction) of the damping signal is the reverse of the polarity (direction) of the rotate of the steering wheel. The damping signal of the section 26 improves the convergence characteristic of the steering system.

Figure 3:
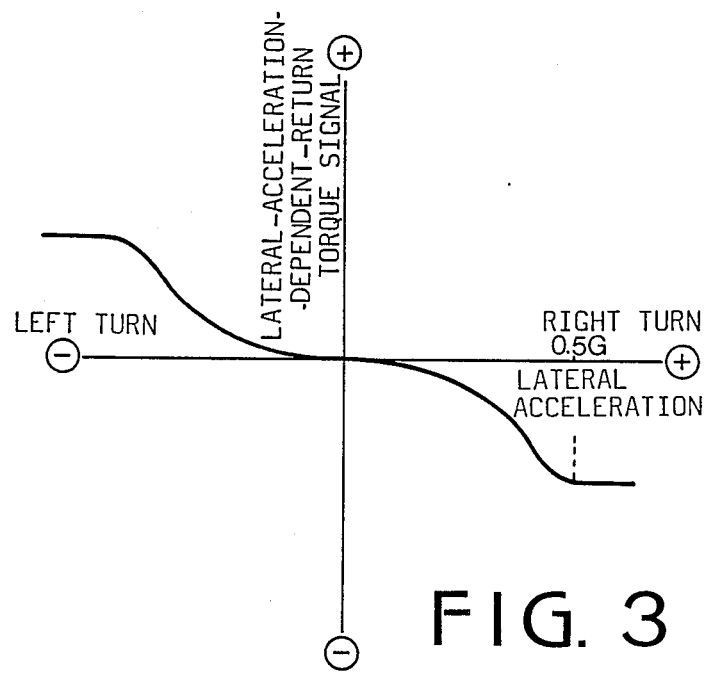
FIGS. 3 and 4 are graphs showing characteristics of lateral-acceleration-dependent return signals.

The system of the present invention has a lateral acceleration calculator 63 for calculating a lateral acceleration based on the vehicle speed from the vehicle speed sensor 33 and on the steering angle from the steering angle sensor 13. The output of the calculator 63 is fed to a lateral-acceleration-dependent return torque signal generator 64. As shown in FIG. 3, the lateral-acceleration-dependent return torque signal produced at the generator 64 increases with an increase of the lateral acceleration below the lateral acceleration of 0.5 G and has a constant value above 0.5 G. The lateral-acceleration-dependent return torque signal, the return torque and the damping signals are added together. The summation of the signals are fed to a vehicle speed gate 65 which opens to pass the summation when the vehicle speed exceeds a predetermined speed, for example 5 Km/h.

The assist signal, auxiliary assist signal, and the summation of the signals are added together and the summation is applied to a positive-negative deciding section 16 and an absolute value section 17 of the drive control section 25. The output of the positive-negative deciding section 16 is applied to the motor 7 through a motor driver 20. The output signal of the absolute value section 17 is applied to a duty ratio control section 18 which produces a pulse train. The pulse train is applied to the driver 20 so that the output torque of the motor 7 is controlled by the duty ratio of the pulse train. The output torque of the motor is fed back to the duty ratio control section 18 by an armature current detecting section 19.

In operation, when a torsion torque is generated by a steering operation, an assist signal is generated from the assist command section 22. The polarity and absolute value of the assist signal is detected and the duty ratio is decided in accordance with the absolute value by the drive control section 25, so that the output torque of motor 7 is controlled to reduce the steering effort.

In response to the output of the phase correcting section 51, the auxiliary assist signal generating section 52 generates an auxiliary assist signal. The auxiliary assist signal is added to the assist signal.

On the other hand, the return command section 24 produces a return torque signal. The return torque signal increases with an increase of the steering angle until a predetermined angle after which it has a constant value. Accordingly, when the steering wheel is released from the driver's hands, the motor 7 operates to return the steering wheel.

When the steering wheel is quickly turned during the driving of a vehicle, the rotational velocity of the steering angle is detected by the steering angle phase correcting section 61. The output of the section 61 is applied to damping signal generating section 62 which produces a damping signal. The damping signal has a reverse polarity to the rotational direction of the steering wheel.

On the other hand, the return torque signal generator 64 produces a return torque signal dependent on the lateral acceleration calculated at the calculator 63 and having a characteristic for returning the steering wheel to the neutral position. Since the return torque signal increases with an increase of the lateral acceleration, the steering wheel is returned without delay, even if the vehicle turns a corner under high lateral acceleration.

Figure 4:
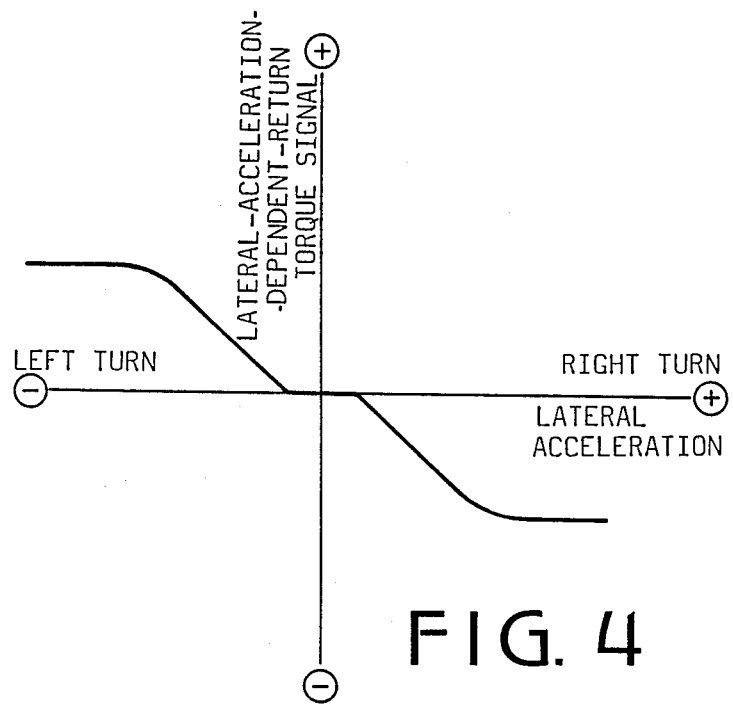

Although, in the above-described system, the return command section 24 is provided, the section 24 may be omitted and the return torque signal may be generated only by the lateral-acceleration-dependent torque signal generator 64. In such a system, it is necessary to provide a sufficient return torque in a low lateral acceleration range. FIG. 4 shows a return torque characteristic for such a requirement, in which the return torque increases linearly. Further, although the lateral acceleration is calculated based on vehicle speed and steering angle, the lateral acceleration can be obtained by a lateral acceleration sensor mounted on a motor vehicle, for producing a lateral acceleration signal.

While the presently preferred embodiments of the present invention have been shown and described, it is to be understood that this disclosure is for the purpose of illustration and that various changes and modifications may be made without departing from the scope of the invention as set forth in the appended claims.

What is claimed is:

1. An electric power steering system for a motor vehicle, comprising
    a motor operatively connected to a steering system for reducing steering effort,
    a vehicle speed sensor for producing a vehicle speed signal,
    a torsion torque sensor provided for detecting torsion torque which is generated in the steering system during a steering operation,
    assist means responsive to an output signal of the torsion torque sensor for producing an assist signal,
    driving means responsive to the assist signal for producing a signal for driving the motor,
    a steering angle sensor provided for detecting steering angle of a steering wheel for producing a steering angle signal,
    first means responsive to said vehicle speed signal and said steering angle signal for producing a lateral acceleration signal dependent on lateral acceleration exerted on the motor vehicle while said vehicle speed signal is lower than a predetermined value,
    second means responsive to the lateral acceleration signal for producing a first return torque signal dependent on the lateral acceleration, and
    third means for adding the first return torque signal to the assist signal to operate the motor dependent on the first return torque signal via said driving means to return the steering wheel, so as to prevent returning delay of the steering wheel at turning of a corner under high lateral acceleration.

2. The system according to claim 1, wherein the lateral acceleration signal is calculated based on the vehicle speed signal and the steering angle signal.

3. The system according to claim 1, further comprising return means responsive to the steering angle signal for producing a second return torque signal which is added to the first return torque signal to operate the motor dependent thereon via said driving means.

4. The system according to claim 3, wherein
    said return means increases said second return torque signal with increasing steering angle, said driving means for driving the motor such that the greater the sum of the return torque signals the greater a force being provided by the motor for returning of the steering wheel.

5. The system according to claim 4, wherein
    said second return torque signal is constant at steering angles greater than a predetermined value.

6. The system according to claim 1, wherein
    said second means is for increasing said first return torque signal with an increase of the lateral acceleration below a first predetermined value, said driving means for driving the motor such that the greater the first return torque signal the greater a force being provided by the motor for returning of the steering wheel.

7. The system according to claim 6, wherein said second means is for increasing said first return torque signal linearly with an increase of the lateral acceleration.

8. The system according to claim 6, wherein said second means is for keeping said first return torque signal constant above said first predetermined value.

9. The system according to claim 8, wherein said second means is for keeping said first return torque signal constant below a second predetermined value which is smaller than said first predetermined value.

10. The system according to claim 1, further comprising damping command means responsive to said steering angle signal for providing a damping signal to operate the motor via said driving means, said damping signal increasing with an increase of steering angular velocity and being added to said first return torque signal.

11. The system according to claim 10, wherein said damping signal is provided when said steering angular velocity exceeds a predetermined small value and is constant when said steering angular velocity is above a predetermined large value and has a polarity reverse of that of rotation of the steering wheel.

12. The system according to claim 1, further comprising gate means responsive to said vehicle speed signal for sending said first return torque signal to said third means when vehicle speed exceeds a predetermined speed.

13. An electric power steering system for a motor vehicle, comprising a motor operatively connected to a steering system for reducing steering effort, a torsion torque sensor provided for detecting torsion torque which is generated in the steering system during a steering operation, assist means responsive to an output signal of the torsion torque sensor for producing an assist signal, driving means responsive to the assist signal for producing a signal for driving the motor, first means for producing a varying lateral acceleration signal dependent on lateral acceleration exerted on the motor vehicle, second means responsive to the lateral acceleration signal for producing a varying first return torque signal as a function of the lateral acceleration, and third means for adding the first return torque signal to the assist signal to operate the motor as a varying function dependent on the first return torque signal via said driving means to return the steering wheel, so as to prevent returning delay of the steering wheel at turning of a corner under high lateral acceleration.

14. The system according to claim 13, wherein said first means comprises a lateral acceleration sensor mounted on the motor vehicle.

* * * * *